March 24, 1942. F. WEST, JR 2,277,027
TELEMETRIC SYSTEM
Filed May 2, 1940
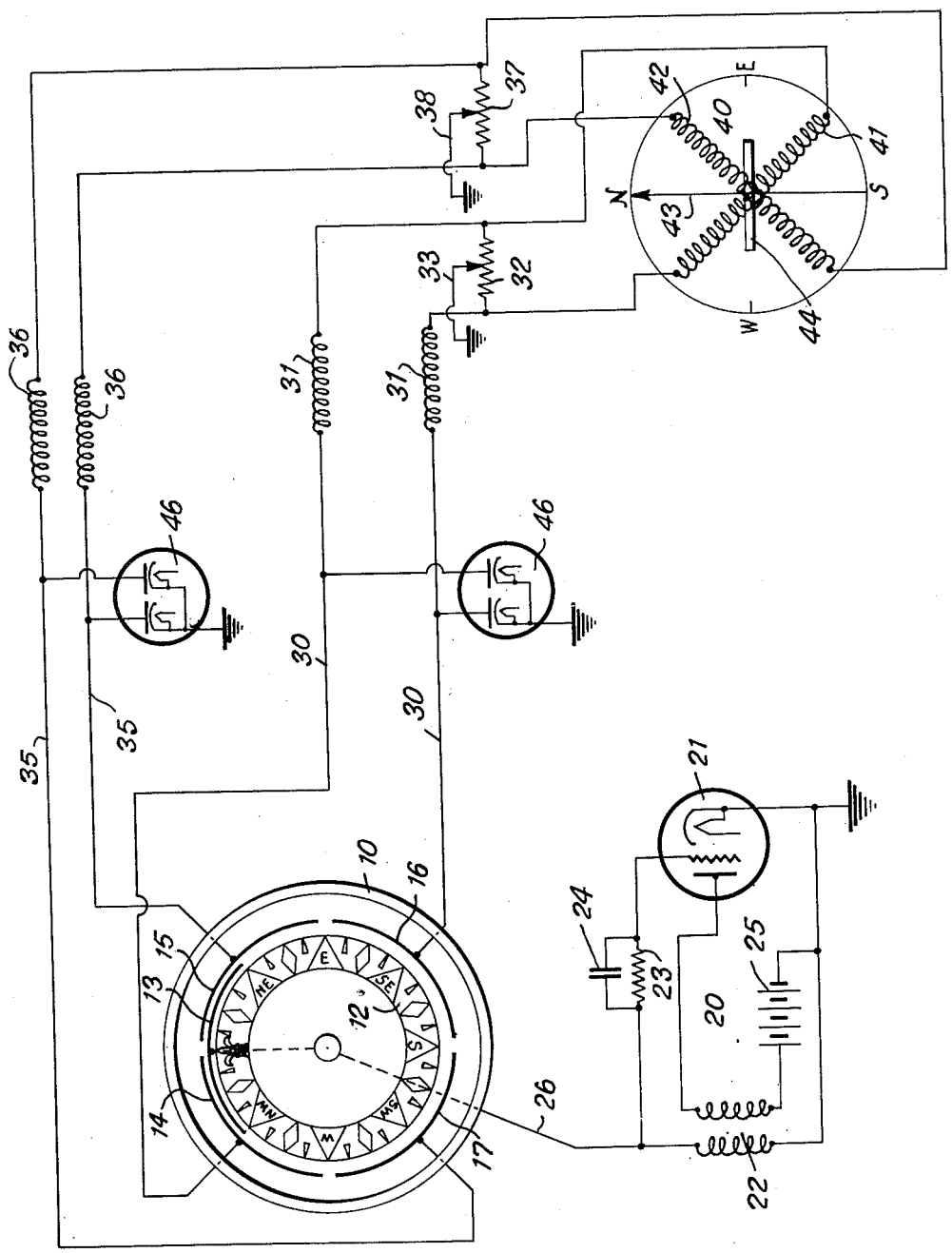
INVENTOR
FRANCIS WEST JR
BY Bromley Seeley
ATTORNEY Patented Mar. 24, 1942

2,277,027

UNITED STATES PATENT OFFICE 2,277,027

TELEMETRIC SYSTEM

Francis West, Jr., Boston, Mass., assignor to West Instrument Co., Inc., New York, N. Y., a corporation of New York Application May 2, 1940, Serial No. 332,906

5 Claims. (Cl. 33—223)

This invention relates to telemetric systems for repeating at one or more distant points the operation of a master instrument, and an object is to provide a simple, dependable system of improved construction and arrangement.

A further object is to provide a repeater system particularly adapted for use with magnetic compasses constructed and arranged to cause one or more indicators located at a distance from a compass to repeat or show the correct compass reading at any given time. This permits the compass itself being permanently located in any suitable place where it is free from local magnetic influences, while the indicator itself can be located wherever desired. Such a system is particularly useful on ships, planes, or the like.

These and other objects which will be apparent to those skilled in the art are accomplished by the present invention, one embodiment of which is shown in the accompanying drawing which is a diagrammatic view of one practical application of the invention.

In general, the present invention provides an electric system in which a master instrument such, for example, as a magnetic compass controls through a plurality of variable condenser the capacity of a corresponding number of circuits, each of which includes an impedance capacity bridge. Across each bridge circuit there is connected one coil of a multicoil, moveable vane indicator. Each compass-actuated condenser controls the balance or unbalance of the associated bridge circuit, in accordance with any movement of the magnetic compass element or other master instrument, and this in turn controls the magnetic field established by the associated meter coil so that the meter, or indicator reproduces at any instance the exact reading of the compass, or other master instrument.

An illustrative embodiment of the invention is shown in the accompanying drawing in connection with a magnetic compass which is diagrammatically illustrated as including a bowl 10 filled with a so called damping fluid which in this instance, is also an effective dielectric as hereinafter brought out.

Usually the magnetic element 11 of the compass actuates a compass card 12 having conventional compass markings. A condenser plate 13 is mounted for movement with the magnetic element as, for example, by supporting it adjacent the periphery of the card, although it may obviously be mounted upon a separate element magnetically coupled to the compass needle in any well known manner for simultaneous movement therewith. The plate 13 is of a very light metal such, for example, as aluminium, so that it has no effect upon the inertia, damping, or period characteristics of the compass. It provides a condenser plate forming approximately 90 degrees of the compass circumference. The plate forms the moveable plate of a variable condenser which also includes a plurality, in the illustrated embodiment four, separate stationary condenser plates 14, 15, 16, and 17, which are supported in any desired manner within the compass closely adjacent the path of movement of the moveable plate 13. The stationary plates are separated from each other in the manner shown in the drawing and cooperate with the relatively moveable plate 13. This form of condenser is sometimes termed a "differential" condenser. All plates are perfectly concentric with the compass card so that all points on the moveable plate 13 are always equal distance from the opposite points on the stationary plates. Preferably, the plates are also formed on spherical surfaces so that no dipping of the card in the bowl will produce any capacity change in the electric circuits associated with the plates, but such capacity change will result only from movement of the magnetic element and the associated plate 13 in a substantially horizontal plane.

It will be noted that each plate of each pair of stationary plates is located diametrically opposite the other. Each pair of diametrically opposed stationary plates forms part of a high frequency alternating current circuit, which is provided with a substantially constant high frequency alternating current of, for example, 450 kilocycles from any suitable source such, for example, as an oscillator circuit 20 including the usual triode tube 21, inductively coupled coils 22, grid leak resistor 23, by pass condenser 24, and source 25 of plate voltage. Current of a constant high frequency is delivered to the condenser plates through line 26 which is connected in any suitable manner through the compass bowl 10 to the moveable condenser plate 13.

Each diametrically opposed pair of stationary condenser plates, for example, plates 14 and 16, is connected through lines 30 and choke coils 31 to the opposite terminals of a potentiometer 32 the adjustable element 33 of which is connected through a ground connection with the A. C. generator.

It will be apparent that the stationary condenser plates 14 and 16, the lines 30, coils 31 and potentiometer 32 constitute an impedance capacity bridge.

A similar arrangement is provided for the other pair of stationary plates 15 and 17 which are connected through lines 35 and choke coils 36 to the opposite terminals of potentiometer 37 the moveable element 38 of which is grounded.

Connected across each bridge circuit is one coil of a crossed-coil moving-vane meter which forms the indicator or repeating instrument of the system. In the drawing the indicator 40 includes a plurality, in this case two crossed coils corresponding in number to the number of bridge circuits. One coil 41 is connected across the bridge circuit formed by the lines 30 and is controlled by condenser plates 14 and 16, while the second coil 42 is connected across the bridge formed by the lines 35 and controlled by plates 15 and 17. This indicator has the usual pointer 43 and moveable vane 44 in the form of a permanent magnet, the position of which is determined by the magnetic field produced by the coils 42 and 43.

Means are provided in each bridge circuit for rectifying the alternating current to direct current for actuating the moving vane meter. As illustrated, a double diode tube 46 is employed for this purpose with each bridge circuit. Each tube has its separate plates connected to opposite sides of the associated bridge circuit and the cathode of each tube is grounded. Obviously, each double diode tube operates as a half wave rectifier for each bridge circuit, by-passing the positive half cycle, for example, back to the oscillator circuit 20, but passing the negative half cycle through associated bridge, the choke coils serving to remove any remaining alternating current component. As a result, a direct current potential is established in each of the separate bridge circuits, and differences in the relative capacity of the bridge circuits resulting from movement of the moveable condenser plate 13 will result in corresponding differences of potential being established in each of the stationary crossed coils of the meter 40. As a result the movable vane 44 or magnet of the meter will repeat the angular movement of the moveable condenser plate 13.

As pointed out above, the compass bowl 10 is filled with a fluid which not only operates as the usual compass damping fluid but which is also suitable as a dielectric between the condenser plates. Mineral oil such, for example, as a highly refined kerosene is generally employed.

In operation, assuming that the compass is pointed due north as indicated in the drawing, the movable plate 13 will be so located as to extend over equal portions of adjacent stationary plates 14 and 15, each of which is connected to a separate bridge circuit. It is assumed that each potentiometer has been so adjusted as to properly balance each bridge circuit. Under these circumstances the capacities of these separate bridge circuits are equal with the result that the magnetic fields established in the crossed coils 41 and 42 are equal so that the movable vane 44 will be held midway between the two coils in the position indicated in the drawing. The pointer is so connected to the vane and so related to the polarity of the coils that it points due north and hence repeats the reading of the compass. It will be understood that the face of the meter is suitably calibrated to give the desired type of reading. Any shift or movement of the compass-controlled moveable plate 13 will vary the relative capacity of the separate bridge circuits in such a way as to change the magnetic effect of the crossed coils resulting in movement of the vane 44 and needle 43 of the indicator to correspond exactly to the movement of the compass. Sufficient movement of the compass to bring the moveable plate 13 opposite either or both of the stationary plates 16 and 17 will reverse the polarity of the associated meter coils and cause the pointer 43 to follow the movement of the compass throughout the complete circle of 360 degrees.

While more than two sets of stationary plates and two bridge circuits can be employed, I now believe that a larger number is not desirable. Also, if desired the potentiometer can be eliminated from each bridge circuit and a connection from the center of the associated meter coil to ground be substituted. It will be apparent that the invention can be variously modified and adapted within the scope of the appended claims.

I claim:

1. The combination in a telemetric system of a movable element, a condenser plate movable with said element, a plurality of relatively stationary condenser plates adjacent the path of movement of said movable plate, a receiver comprising a plurality of coils, conductors connecting said plates to said coils, a source of high frequency current connected to said movable plate and said conductors, means actuated thereby for establishing direct current in said coils whereby the magnetic field of said coils varies in accordance with the movement of said movable element and plate, and a movable member controlled by said field.

2. The combination in a telemetric system of a movable element, a condenser plate movable with said element, a plurality of pairs of diametrically opposed relatively stationary condenser plates adjacent the path of movement of said movable plate, a receiver comprising a plurality of coils corresponding in number to the number of pairs of stationary plates, and arranged in crossed relation corresponding to the relative positions of the separate pairs of stationary plates, conductors connecting the opposite plates of each pair to the opposite ends of an associated coil, a source of high frequency current connected to said movable plate and said conductors, means actuated thereby for establishing direct current in said coils whereby the magnetic field of said coils varies in accordance with the movement of said movable element and plate, and a movable member controlled by said field and movable thereby in accordance with the movement of said element.

3. The combination in a telemetric system of a magnetic compass including a compass bowl, a magnetic element, and a damping fluid in said bowl forming a dielectric, a movable condenser plate located in said bowl and movable with said element, a plurality of pairs of diametrically opposed relatively stationary condenser plates in said bowl adjacent the path of movement of said movable plate, a receiver comprising a plurality of coils corresponding in number to the number of pairs of stationary plates, and arranged in crossed relation corresponding to the relative positions of the separate pairs of stationary plates, conductors connecting the opposite plates of each pair to the opposite ends of an associated coil, a source of high frequency current connected to said movable plate and said conductors, means actuated thereby for establishing direct current in said coils whereby the magnetic field of said coils varies in accordance with the movement of said movable element and plate, and a movable member controlled by said field and movable thereby in accordance with the movement of said element.

4. The combination in a telemetric system of a magnetic compass including a compass bowl, a magnetic element, and a damping fluid in said bowl forming a dielectric, a movable condenser plate located in said bowl and movable with said element, a plurality of pairs of diametrically opposed relatively stationary condenser plates in said bowl adjacent the path of movement of said movable plate, a receiver comprising a plurality of coils corresponding in number to the number of pairs of stationary plates, and arranged in crossed relation corresponding to the relative positions of the separate pairs of stationary plates, conductors connecting the opposite plates of each pair to the opposite ends of an associated coil, an impedance capacity bridge in the circuit between each coil and the associated pair of plates, a source of high frequency current connected to said movable plate and said bridge circuits, means actuated thereby for establishing direct current in each bridge and coil whereby the magnetic field of said coils varies in accordance with the movement of said movable element and plate, and a movable member controlled by said field and movable thereby in accordance with the movement of said element.

5. The combination in a telemetric system, of a rotatable element movable through 360°, a condenser plate movable with said element, a plurality of cooperating condenser plates adjacent to the path of movement of said movable plate, conductors connected to said plurality of plates and forming the opposite sides of an impedance capacity bridge, a source of substantially constant high frequency current connected to said conductors through said condenser plates, means for establishing direct current in said conductors, a repeater mechanism including a member rotatable through 360° for repeating the movement of said element, means for controlling the movement of said member including a movable magnetic element and a current responsive device connected across the conductors forming said bridge and having a coil cooperating with said magnetic element to control the movement thereof, whereby relative movement between said first named condenser plate and said co-operating plates unbalances said bridge to produce an actuating current through said device and said coil to operate said magnetic element and cause said member to move.

FRANCIS WEST, Jr.